US007764230B2

(12) United States Patent
Chizhik et al.

(10) Patent No.: US 7,764,230 B2
(45) Date of Patent: Jul. 27, 2010

(54) METHODS FOR LOCATING TRANSMITTERS USING BACKWARD RAY TRACING

(75) Inventors: Dmitry Chizhik, Highland Park, NJ (US); Reinaldo A. Valenzuela, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/717,007

(22) Filed: Mar. 13, 2007

(65) Prior Publication Data

US 2008/0224930 A1    Sep. 18, 2008

(51) Int. Cl.
*G01S 3/02* (2006.01)
(52) U.S. Cl. ...................................... 342/453
(58) Field of Classification Search ................. 342/453
See application file for complete search history.

(56) References Cited

U.S. PATENT DOCUMENTS

| 5,450,615 | A |  | 9/1995 | Fortune et al. |
| 5,623,429 | A |  | 4/1997 | Fortune et al. |
| 5,719,584 | A | * | 2/1998 | Otto ........................... 342/465 |
| 6,839,560 | B1 |  | 1/2005 | Bahl et al. |
| 6,965,344 | B1 |  | 11/2005 | Halsey et al. |
| 7,013,150 | B2 |  | 3/2006 | Okanoue et al. |
| 2004/0259554 | A1 | * | 12/2004 | Rappaport et al. .......... 455/446 |
| 2005/0179591 | A1 | * | 8/2005 | Bertoni et al. .............. 342/453 |

FOREIGN PATENT DOCUMENTS

| CA | 2 558 626 A1 | 12/2006 |
| CA | 2 588 626 A1 | 12/2006 |
| EP | 0 664 619 A1 | 7/1995 |

OTHER PUBLICATIONS

Andrew M. Ladd et al. "On the Feasibility of Using Wireless Ethernet for Indoor Localization". IEEE Transactions on Robotics and Automation, vol. 20, No. 3 pp. 555-559, Jun. 2004.

Sinan Gezici et al. "Localization via Ultra-Wideband Radios". IEEE Signal Processing Magazine pp. 70-84, Jul. 2005.

Paramvir Bahl et al. "RADAR: An In-Building RF-based User Location and Tracking System" INFOCOM 2000: pp. 775-784, 2000.

(Continued)

*Primary Examiner*—Thomas H Tarcza
*Assistant Examiner*—Nga X Nguyen
(74) *Attorney, Agent, or Firm*—Harness, Dickey & Pierce, P.L.C.

(57) ABSTRACT

According to a method for localizing a transmitter inside a building, a transmitter emits rays which undergo multiple reflections with the walls, ceilings and floors of the building. Each of K receivers receives rays from the transmitter, and the receivers estimates the AOA (Angle of arrival), TOA (Time of Arrival) and power of each ray. At least one of the receivers uses a known blueprint of the building and material characteristics of the walls to localize the transmitter to a higher degree of accuracy by applying a backward ray tracing algorithm.

16 Claims, 5 Drawing Sheets

OTHER PUBLICATIONS

Kamran Sayrafian-Pour et al. "Indoor Positioning Using Spatial Power Spectrum". Personal, Indoor and Mobile Radio Communications, PIMRC 2005. IEEE 16$^{th}$ International Symposium on Sep. 11-14, 2005. vol. 4, pp. 2722-2726, 2005.

Veljo Otsason et al. "Accurate GSM Indoor Localization". In Beigl, M., Intille, Ubicomp. vol. 3660 of Lecture Notes in Computer Science., Springer, pp. 141-158. 2005.

Peter Voltz et al. "A time-domain backpropagating ray technique for source localization". Acoustical Society of America, pp. 805-812, Feb. 1994.

Steven J. Fortune et al. "Wise Design of Indoor Wireless Systems". IEEE Computational Science and Engineering. pp. 58-68, 1995.

Kimpe M. et al. "Ray Tracing for Indoor Radio Channel Estimation", Universal Personal Communications, 1993. Personal Communications: Gate Way to the 21st Century. Conference Record, 2nd International Conference on Ottawa, Ont., Canada Oct. 12-15, 1993. New York; IEEE, vol. 1, pp. 64-68, Oct. 12, 1993.

Notification of Transmittal of the International Preliminary Report on Patentability dated Apr. 20, 2009.

* cited by examiner

METHODS FOR LOCATING TRANSMITTERS USING BACKWARD RAY TRACING

GOVERNMENT CONTRACT

The U.S. Government has a paid-up license in this invention and the right in limited circumstances to require the patent owner to license others on reasonable terms as provided for by the terms of Government Contract No. SB134105W1363.

BACKGROUND

Localization of a transmitter is important in many applications. For example, in an emergency situation (e.g., a fire within a large building), having the ability to monitor the location of emergency personnel, such as police, fire-fighters etc., at an external monitoring unit may enable better coordination and/or safety.

In outdoor scenarios, transmitters may be localized by attaching GPS devices to the transmitters. However, the reception of GPS signals is unreliable in most structures and buildings, and thus, localizing transmitters inside structures and buildings using GPS devices is difficult, and in some cases, impossible.

Conventional methods for localizing transmitters within structures or buildings are classified into three categories: time of arrival (TOA), angle of arrival (AOA) and signal strength based technologies. Each method is implemented within existing networks using technologies such as, GSM, 802.11b, Bayesian based localization or ultra-wideband (UWB) techniques. However, these conventional methods generally require more than one receiver to provide accurate localization of a transmitter, or are unable to locate transmitters within structures or buildings, as is the case with GPS signals because these signals are often corrupted by delay spreading and attenuation experienced on building penetration and scattering.

Because of these limitations, other technologies have been developed to locate and track users or objects in an in-building environment. One such system uses tags placed on the items that are to be tracked. The tags can be either active or passive. An active tag contains power circuitry, which can communicate with base stations. A passive tag contains no internal power, rather it is charged either inductively or electromagnetically as it passes within the range of a base station. Using this derived power, the passive tag communicates with the station. The base stations are physically linked together through a wired or wireless network. Each tag transmits a code uniquely identifying itself. Thus, the location of the tag is determined to be in the vicinity of the base station with which the tag last communicated.

Such tag-based tracking and location systems, while being useful in an in-building environment, require a significant installation of specialized base stations. A tag-based system can only determine the location of the tags as being "near" a particular base station, consequently, to achieve a sufficiently high resolution, a large number of base stations must be installed. Obtrusive tags have to be placed on every item that is to be tracked or located, and in the case of infra-red tags, the system operates only when there is a "line-of-sight" between the tag and a base station. For all these reasons location-determination technology based on tags has had very limited success.

SUMMARY OF THE INVENTION

Example embodiments provide methods, apparatuses and systems for localizing transmitters. At least some example embodiments use backward ray tracing indoor transmitter location prediction. At least some methods combine time of arrival (TOA), angle of arrival (AOA) and signal strength based techniques with backward ray tracing into a single framework.

According to at least one example embodiment, a transmitter may be located based on signals received by one or more receivers. The receivers measure received power as a function of AOA as well as TOA.

At least one example embodiment provides a method for locating a transmitter. According to at least this example embodiment, at a receiver, a plurality of candidate locations for the transmitter may be generated based on signal ray characteristics of a plurality of signal rays. The candidate locations may be points along an estimated path traversed by the plurality of signal rays from the transmitter to the receiver. The receiver may locate the transmitter based on at least one metric associated with each candidate location. The at least one metric may be generated based on the signal ray characteristics and virtual signal ray characteristics at each candidate location.

At least one other example embodiment provides a transceiver for locating a transmitter. The transceiver may include location estimation unit configured to generate a plurality of candidate locations for the transmitter based on signal ray characteristics of a plurality of signal rays. The candidate locations may be points along an estimated path traversed by the plurality of signal rays from the transmitter to the receiver. The location estimation unit may be further configured to locate the transmitter based on at least one metric associated with each candidate location. The at least one metric may be generated based on the signal ray characteristics and virtual signal ray characteristics at each candidate location.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EXAMPLE EMBODIMENTS

Example embodiments provide methods and algorithms for localizing emitters and/or transmitters, at a receiver, using a backward ray tracing algorithm referred to as Emitter Localization and Visualization (ELVIS). According to at least one example embodiment, backward ray tracing is used to predict locations of transmitters within a structure, such as, a building. Localization methods, according to at least some example embodiments, combine time of arrival (TOA), angle of arrival (AOA) and signal-strength based techniques with backward ray tracing into a single framework.

At least one example embodiment enables localization of a transmitter inside a building based on characteristics of signals received, from the transmitter, by one or more receivers located outside of the structure or building. Example embodiments enable more accurate determining of the position of the transmitter within a building or other structure, regardless of whether the transmitter or receiver is stationary, mobile (e.g., being carried by a first responder, such as a firefighter) or whether a line-of-sight exists between the transmitter and receiver.

In the drawings, like reference numerals refer to like elements.

Example embodiments are illustrated as being implemented in a suitable computing environment. Although not required, example embodiments will be described in the general context of computer-executable instructions, such as program modules, being executed by a computer processor or CPU. Generally, program modules include routines, programs, objects, components, data structures, etc. that perform particular tasks or implement particular abstract data types. Moreover, those skilled in the art will appreciate that example embodiments may be practiced with other computer system configurations, including mobile or cellular phones, handheld devices, multi-processor systems, microprocessor based or programmable consumer electronics, network PCs, minicomputers, mainframe computers, and the like. Example embodiments may also be practiced in distributed computing environments where tasks are performed by remote processing devices that are linked through a communications network. In a distributed computing environment, program modules may be located in both local and remote memory storage devices.

In the following description, example embodiments will be described with reference to acts and symbolic representations of operations that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while example embodiments are described in the foregoing context, it is not meant to be limiting as those of skill in the art will appreciate that various acts and operations described hereinafter may also be implemented in hardware.

Example embodiments will be discussed with regard to a transmitter located within a building, however, example embodiments may also be used in locating transmitters within other structures, such as tunnels, and/or in crowded or mountainous areas. According to at least one example embodiment, the location of a transmitter may be estimated based on received signal characteristics using a backward ray tracing algorithm.

Figure 1:
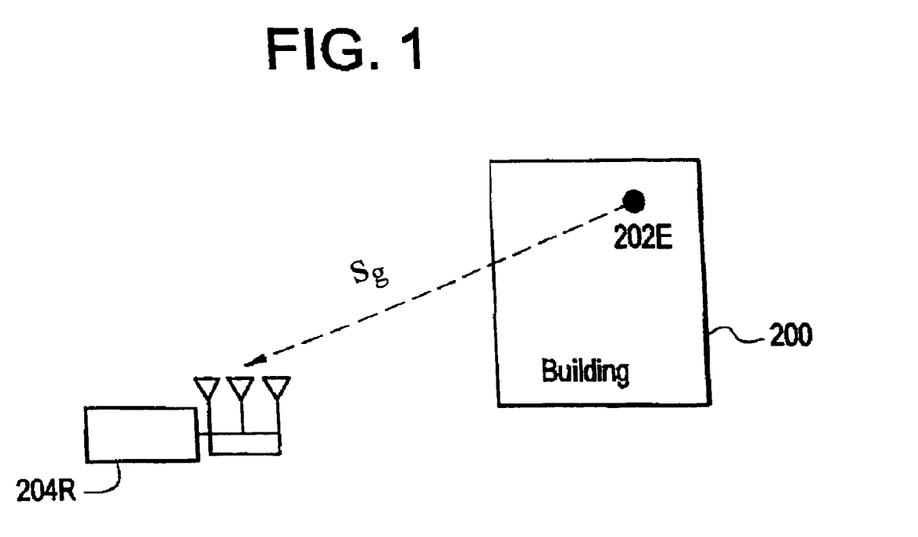
FIG. 1 illustrates a transmitter localization system according to an example embodiment.

FIG. 1 illustrates a transmitter localization system according to an example embodiment.

Referring to FIG. 1, a receiver 204R located outside of a building 200 may localize (or locate) a transmitter 202E within building 200 using a localization method, according to an example embodiment, which will be discussed in more detail below with regard to FIG. 3.

According to at least this example embodiment, the transmitter 202E transmits (or emits) wireless signals, which may be received at the receiver 204R via a plurality of propagation paths. The transmitter 202E may be any type of transmitter, transceiver or communications equipment capable of emitting omni-directional, electromagnetic radiation signals (e.g., radiofrequency (RF) signals). For example, the transmitter 202E may transmit wireless signals $s_g$, such as well-known wireless communication signals (e.g., GSM, CDMA, TDMA, etc.) or any other suitable radio-frequency (RF) signal, capable of penetrating and/or being reflected by walls and/or structures of the building 200.

The signals $s_g$ emitted by the transmitter 202E may have known signal characteristics such as transmission power $P_T$, etc.

Figure 2:
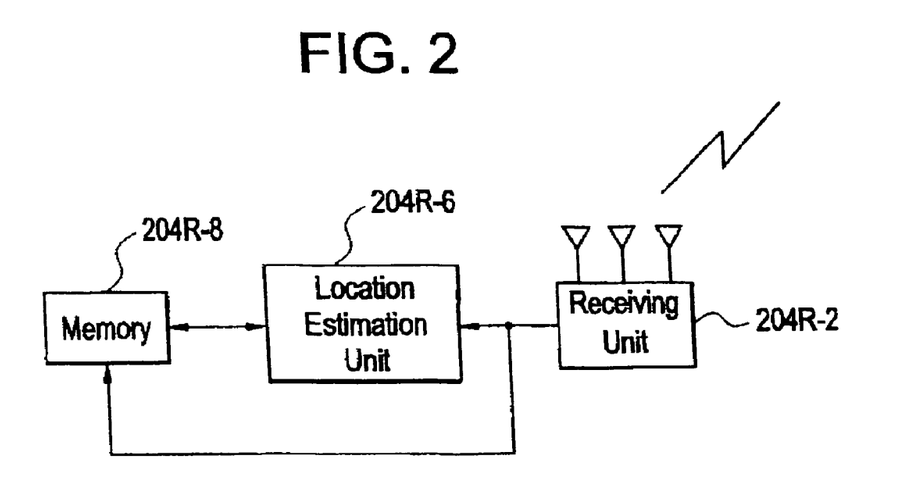
FIG. 2 illustrates a receiver according to an example embodiment.

FIG. 2 illustrates receiver 204R in more detail. As shown, the receiver 204R may include a receiving unit 204R-2 for transmitting, receiving and processing wireless signals, such as, the above-described wireless communication signals (e.g., GSM, CDMA, TDMA, etc.). The receiving unit 204R-2 may include an antenna array having one or more antennas, each of which may be capable of transmitting and receiving the above-described wireless signals transmitted by the transmitter 202E of FIG. 1.

The receiving unit 204R-2 may include a well-known antenna array, and may be capable of determining signal characteristics, such as, receiving power, angle of arrival (AOA), time of arrival (TOA), etc. for each received signal or "ray." The receiving unit 204R-2 may measure the received power of a ray as a function of elevation angle, azimuth angle, TOA, etc. Because antennas, antenna arrays and receiving units such as this are well-known in the art, a detailed discussion thereof will be omitted for the sake of brevity.

Rays are described by a starting point and a direction vector, and may be of infinite length. If a ray hits a wall, the ray becomes a ray segment. Ray segments are described by a starting point and an end point, where the end point is known as the point of incidence (POI). Methods for determining the above-described signal characteristics are well-known and thus will only be discussed briefly herein for the sake of brevity.

Still referring to FIG. 2, the receiver 204R may also include a location estimation unit (LEU) (or back ray tracer) 204R-6 and a memory 204R-8. The signal characteristics for each ray determined by the receiving unit 204R-2 may be output to a LEU 204R-6, and concurrently stored in the memory 204R-8. A method of operation of the LEU 204R-6 will be described in more detail with regard to FIG. 3

Figure 3:
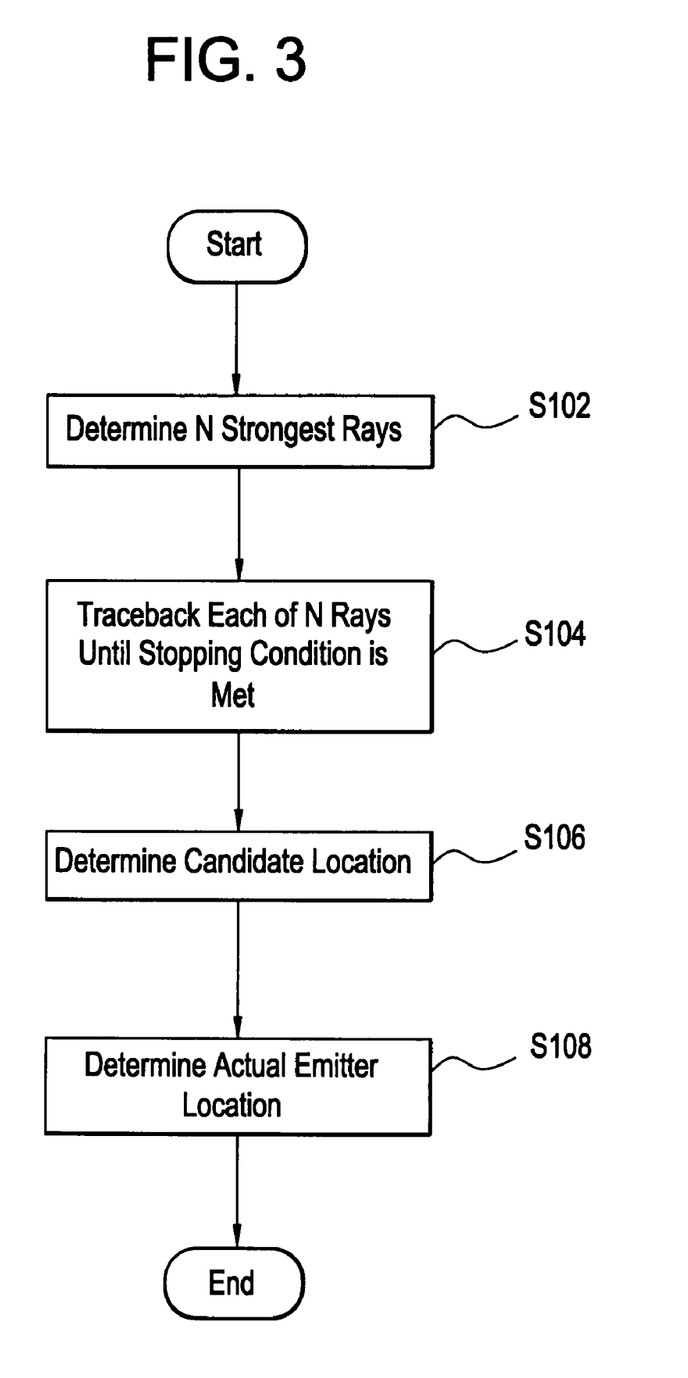
FIG. 3 is a flow chart illustrating a method for localizing a transmitter according to an example embodiment.

FIG. 3 illustrates a method for localizing a transmitter, according to an example embodiment. As discussed above, the method of FIG. 3 may be performed at the LEU 204R-6 shown in FIG. 2.

Referring to FIGS. 2 and 3, upon receiving signal ray characteristics for each ray from the receiving unit 204R-2, at step S102, the LEU 204R-6 may determine the N strongest rays. That is, for example, the LEU 204R-6 may compare the receiving power of each received ray to determine the N rays having the strongest receiving power.

Alternatively, the LEU 204R-6 may determine the N strongest rays by filtering. That is, for example, the LEU 204R-6 may compare the receiving power associated with each received ray to a predetermined or given threshold. Each ray having an associated receiving power greater than or equal to the threshold may be chosen as one of the N strongest rays. In this example, the threshold may be determined, for example, by a human operator using, for example, empirical data regarding the structure of the building, the known transmission power of the transmitter, etc.

According to example embodiments, the receiver 204R may have knowledge of a blueprint of the building in which the transmitter 202E is located and information regarding the structural composition of the building (e.g., material compositions of the walls, etc.)

After determining the N strongest received rays, at step S104, the LEU 204R-6 may estimate the path of the received ray from transmitter 202E to receiver 204R using a backward ray tracing algorithm. That is, for example, the receiver 204R may trace back, via a simulation within the LEU 204R-6, each of the N rays to sequential points of incidence until a stopping condition is met. In tracing back the received ray, the LEU 204R-6 may simulate the reverse path of the actual ray using a simulated virtual ray, which follows an estimated path of the received ray.

Virtual rays are simulated rays also described by a starting point and a direction vector, and may be of infinite length. If a virtual ray hits a wall, the virtual ray becomes a virtual ray segment. Virtual ray segments are described by a starting point and an end point, where the end point is known as the point of incidence (POI). In other words, a virtual ray segment is a portion of a virtual ray.

According to at least some example embodiments, a stopping condition is met at a particular point of incidence if:

(a) The predicted power P of a virtual ray at the point of incidence is greater than or equal to the expected power $P_T$, where the expect power $P_T$ is the known transmit power of the transmitter;
(b) The number of points of incidence on the path traversed by the virtual ray exceeds a threshold limit; or
(c) The virtual ray has left the building.

When a stopping condition is met, the trace back may be terminated. The location of each point of incidence (or point) encountered during trace back may be recorded (e.g., in the form of coordinates determined using, for example, the blueprint of the building) within the memory 204R-8. Within the memory 204R-8, the points of incidence may be stored in association with the received ray being traced back. Characteristics for all backward-traced rays (e.g., ray power, propagation delays, etc.) and the building blueprint for the building 200 may also be stored at memory 204R-8.

The tracing back of each of the N rays may be performed sequentially or in parallel, and methods for doing so will be discussed in more detail below with regard to FIG. 4. As noted above, backward ray tracing may be performed as a simulation at the LEU 204R-6.

Referring again to FIG. 3, after tracing back the N strongest rays at step S104, the LEU 204R-6 may determine candidate locations based on the points of incidence stored in the memory 204R-8 at step S106. The determined candidate locations may represent possible locations of the transmitter 202E.

Candidate locations are pair-wise intersections (or, alternatively, approximate intersections within a range specified by a user or human operator) of the back-traced rays. That is, for example, a candidate location may be a point of incidence common to at least two back-traced rays. According to at least one example embodiment, if more than two virtual rays intersect at the same point of incidence, the point may have multiple candidate locations.

Under ideal conditions, an actual location of the transmitter 202E is characterized by having multiple virtual ray intersections with the predicted power P of all virtual rays equal to the transmit power $P_T$, and the estimated propagation times for each virtual ray from receiver 204R to transmitter 202E also being equal.

As noted above, to generate candidate locations, the LEU 204R-6 may determine points of incidence at which at least two virtual rays intersect. A point of incidence is a point at which a virtual ray strikes or impinges a wall or structure.

According to at least one example embodiment, the LEU 204R-6 may determine candidate locations by parsing the points of incidence stored in the memory 204R-8. Because the points of incidence are stored in association with each received ray being traced back, the LEU 204R-6 may compare the location of each point of incidence associated with each back-traced ray to determine those points common to at least two back-traced rays. The points common to at least two back-traced rays may be identified as candidate locations.

Alternatively, the points of incidence may be stored in association with each virtual ray. In this example, the LEU 204R-6 may compare the location of each point of incidence associated with each virtual ray to determine those points common to at least two virtual rays. The points common to at least two virtual rays may be identified as candidate locations.

Referring still to FIG. 3, at step S108, the LEU 204R-6 may determine the actual location of the transmitter 202E based on characteristics (e.g., estimated and/or predicted signal characteristics) associated with each candidate location. According to at least one example embodiment, the characteristics (e.g., estimated and/or predicted signal characteristics) may be associated with virtual rays intersecting at each candidate location.

In one example, the LEU 204R-6 may select a candidate location as the actual location of the transmitter 202E based on at least one metric associated with each of the candidate locations. The at least one metric may be a weighted sum of a plurality of location metrics determined for each of the candidate locations. Although example embodiments will be described with regard to a plurality of location metrics associated with each candidate location, each candidate location may have one or more associated location metrics, and the actual location of the transmitter 202E may be determined based on one or more location metrics associated with each candidate location.

The LEU 204R-6 may determine a weighted metric associated with each stored candidate location, and select the actual location of the transmitter 202E based on the weighted metric associated with each stored candidate location. In selecting a candidate location as the actual location of the transmitter 202E, the LEU 204R-6 may compare the weighted metric associated with each stored candidate location to determine the candidate location with the highest associated weighted metric. The candidate location having the highest weighted metric may be selected or identified as the actual location of the transmitter 202E.

A weighted metric may be a sum of a plurality of location metrics associated with a particular candidate location. Location metrics associated with each candidate location may include a neighboring candidate location metric, a power difference metric, an expected-predicted power metric and/or a delay metric. Each of the location metrics may be determined based on additional measured parameters.

The neighboring candidate location metric may be determined based on the number of intersections or candidate locations in the vicinity of (e.g., nearby or within a given range of a candidate location. Regions with multiple candidate locations may be more likely to contain the actual location of the transmitter 202E. An example method for calculating the neighboring candidate location metric for a particular candidate location will be described in more detail below. For the purposes of this explanation, $n_i$ denotes the number of possible neighboring candidate locations in the vicinity of or nearby the i-th candidate location.

The neighboring candidate location metric may be generated based on the number of possible neighboring candidate locations in the vicinity of or nearby the i-th candidate location and the number of possible neighboring candidate locations in the vicinity of the k-th candidate location. The k-th candidate location refers to the candidate location with the largest number of possible neighboring candidate locations. According to at least this example embodiment, the neighboring candidate location metric $m_{1,i}$ for the i-th candidate location, may be given by equation (1) below, and may produce a numerical value (e.g., a decimal value). As discussed herein, the subscript number (e.g., '1' in $m_{1,i}$) distinguishes between the plurality of location metrics.

$$m_{1,i} = \frac{n_i}{\max_k n_k} \quad (1)$$

The power difference metric may be determined based on the predicted power difference between virtual rays incident at the candidate location. At the actual location of the transmitter, the predicted power P of intersecting virtual rays should be equal or within an acceptable range from one another. For the purposes of this discussion, $p_i$ denotes the absolute power difference between intersecting virtual rays at an i-th candidate location.

The power difference metric may be generated based on the predicted power $p_i$ at the i-th candidate location and the predicted power $p_k$ at the k-th candidate location. The predicted power at the k-th candidate location refers to the maximum predicted power difference for all candidate locations. According to at least this example embodiment, the predicted power difference metric $m_{2,i}$ for the i-th candidate location may be given by equation (2) below, and may produce a numerical value (e.g., a decimal value).

$$m_{2,i} = 1 - \frac{p_i}{\max_k p_k} \quad (2)$$

The expected-predicted power metric may be determined based on a difference between the expected transmit power $P_T$ and predicted power P for each virtual ray incident at the candidate location. At the actual location of the transmitter, ideally, the predicted power P of the incident virtual rays is equal to the known transmission power $P_T$ of the transmitter 202E. However, this is not always the case because of interference and fading of the signal during propagation between the transmitter 202E and the receiver 204R. Thus, the difference between the known transmission power of the transmitter 202E and the estimated power of the virtual ray incident on the candidate location may be used to determine the expected-predicted power metric.

For example purposes, two rays intersecting at the i-th candidate location are considered, and it is assumed $\Delta p_{i,1}$ denotes a first ray's power deviation from the expected power $P_T$ (e.g., $\Delta p_{i,1} = P_1 - P_T$) and $\Delta p_{i,2}$ denotes a second ray's power deviation from the expected power $P_T$ (e.g., $\Delta p_{i,2} = P_2 - P_T$).

A first expected-predicted power metric $m_{3,i}$ may be determined based on the first ray's power deviation $\Delta p_{i,1}$ at the i-th candidate and the power deviation from the expected power at the k-th candidate location $\Delta p_{k,1}$, where the power deviation at the k-th candidate location is the maximum power deviation for all candidate locations. More particularly, the expected-predicted power metric $m_{3,i}$ for the i-th candidate location may be given by equation (3) below, and may produce a numerical value (e.g., a decimal value).

$$m_{3,i} = 1 - \frac{\Delta p_{i,1}}{\max_k \Delta p_{k,1}} \quad (3)$$

Similarly, the second expected-predicted power metric $m_{4,i}$ may be determined based on the second ray's power deviation at the i-th candidate $\Delta p_{i,2}$ and the power deviation from the expected power at the k-th candidate location $\Delta p_{k,2}$, where the power deviation at the k-th candidate location is the maximum power deviation for all candidate locations. More particularly, the second expected-predicted power metric $m_{4,i}$ for the i-th candidate location may be given by equation (4) below, and may produce a numerical value (e.g., a decimal value).

$$m_{4,i} = 1 - \frac{\Delta p_{i,2}}{\max_k \Delta p_{k,2}} \quad (4)$$

Example embodiments may not depend on the arrival times of the rays. However, if the receiver 204R is capable of estimating delay differences among received rays, these arrival times may be estimated for any given candidate location. Thus, the set of relative delays measured by the receiver 204R may be compared against the set of relative delays computed for any candidate location, and the difference, known as the delay metric, may be used as another location metric.

For example, assume two rays, g and h, arrive at receiver 204R at times $t_g$ and $t_h$, respectively. If virtual rays g' and h' are determined to intersect at the i-th candidate location, the relative delay between arrivals of the virtual rays g' and h' may be determined by the LEU 204R-6. For example, because the corresponding path from the receiver 204R to a candidate location is stored in the memory 204R-8, the unwrapped distance $d_{h'}$ and $d_{g'}$ from the receiver 204R to the candidate location may be determined. The unwrapped distance $d_{h'}$ and $d_{g'}$ is the distance traveled by each of virtual rays h' and g', respectively, from receiver 204R to a candidate location. In other words, the unwrapped distance $d_{h'}$ and $d_{g'}$ may be an estimate of the distance traveled by rays h and g, from the candidate location to the receiver 204R. The predicted propagation delays for each of virtual rays g' and h' may then be determined by the LEU 204R-6 using equations (5) and (6).

$$\Delta t_{g'} = \frac{d_{g'}}{c} \quad (5)$$

$$\Delta t_{h'} = \frac{d_{h'}}{c} \quad (6)$$

In each of equations (5) and (6), c is speed of light. Using the results of equations (5) and (6), an arrival time difference metric $z_i$ may be computed for the i-th candidate location using equation (7).

$$z_i = |(t_h - t_g) - (\Delta t_{h'} - \Delta t_{g'})| \quad (7)$$

After having computed the arrival time difference metric $z_i$, a time difference location metric may be given by equation (8) below, and may produce a numerical value (e.g., a decimal value).

$$m_{5,i} = 1 - \frac{z_i}{\max_k z_k} \quad (8)$$

As shown in equation (8), the time difference location metric $m_{5,i}$ may be determined based on the difference in arrival times for virtual rays g' and h' arriving at the i-th candidate location, and the difference in the predicted propagation delays for each of rays g and h.

The above-described weighted metric for each candidate location may be calculated using one or more of the above-discussed location metrics. In calculating the weighted metric, each location metric may be weighted differently depending on the reliability of the measurement. According to at least one example embodiment, a weighted metric for a particular candidate location may be calculated by adding together all location metrics associated with the particular candidate location.

As noted above, after calculating the weighted metric for each candidate location, the weighted metrics may be compared, and the candidate location associated with the highest weighted metric may be selected or chosen as the actual location of the transmitter 202E.

According to at least one example embodiment, the location of the transmitter 202E may be displayed to a user via a display screen, for example, in the form of a building diagram with an identification of the actual location of the transmitter 202E. Such displays are well-known in the art, and as such, a detailed discussion will be omitted for the sake of brevity.

As discussed above, the LEU 204R-6 may identify points of incidence and candidate locations by tracing back each received ray along the path from transmitter 202E to receiver 204R, in reverse order, until a stopping condition is met.

Figure 4:
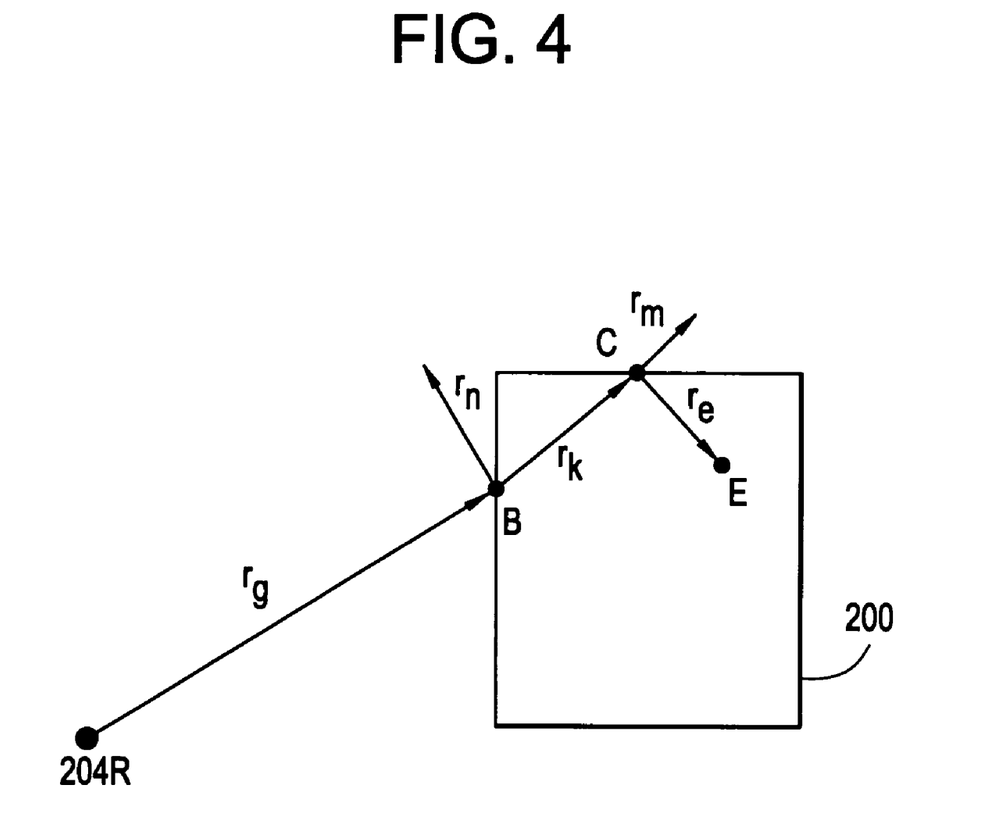
FIG. 4 illustrates a simple example of backward ray tracing according to an example embodiment.

FIG. 4 illustrates a simple example of backward ray tracing according to an example embodiment.

Referring to FIG. 4, the LEU 204R-6 may predict a path traversed by a ray received at receiver 204R from transmitter 202E using the signal characteristics of the received ray and the blueprint of the building stored in the memory 204R-8.

As shown, prior to being received at the receiver 204R, the ray from the transmitter 202E is transmitted and exits the building 200 through point B. Using characteristics of the received ray (e.g., the angle of arrival, receiving power, etc.), the LEU 204R-6 may determine the direction from which the ray was received. Using this directional vector, the LEU 204R-6, via simulation, launches a virtual ray $r_g$ towards point B in the direction from which the ray was received. The virtual ray $r_g$ backward ray traces the final ray segment of the ray transmitted from the transmitter 202E to the receiver 204R. Such backward ray tracing may be performed in the following manner.

In a 3D case, the rectangular wall on which point B lies may be given by equation (9).

$$Ax + By + Cz + D = 0;$$

$$x_{min} \leq x \leq x_{max};$$

$$y_{min} \leq y \leq y_{max};$$

$$z_{min} \leq z \leq z_{max} \quad (9)$$

In equation (9), $n = (A; B; C)^T$ is the normal to the plane of the wall. The line on which the virtual ray $r_g$ lies may be represented in parametric form as:

$$\begin{pmatrix} x \\ y \\ z \end{pmatrix} = \begin{pmatrix} x_0 \\ y_0 \\ z_0 \end{pmatrix} + t \begin{pmatrix} x_d \\ y_d \\ z_d \end{pmatrix} \quad (10)$$

For example purposes, this example embodiment will be described with regard to $(x_0; y_0; z_0)^T$ as the origin position vector of the virtual ray $r_g$ (e.g., the point from which the virtual ray $r_g$ emanates, in this case receiver 204R). Here, $v = (x_d; y_d; z_d)^T$ is the unit vector in the direction of the virtual ray $r_g$ and the length parameter $t(t>0)$ corresponds to the distance between the virtual ray origin $(x_0; y_0; z_0)^T$ and any other point on the virtual ray $r_g$. To find the intersection point of virtual ray $r_g$ and the wall on which point B lies, equation (10) may be substituted into equation (9) obtaining equation (11).

$$Ax_0 + By_0 + Cz_0 + t(Ax_d + By_d + Cz_d) + D = 0 \quad (11)$$

The intersection point B may be determined by solving equation (11) for t. In this example, a valid intersection point occurs if $t \geq 0$ and the constraints discussed above with regard to equation (9) are satisfied. If these constraints are satisfied, the value of t may be used in equation (10) to determine the location of point B (or, more generally, the point of incidence for virtual ray $r_g$). Two new variables may also be introduced:

$$F = Ax_0 + By_0 + Cz_0 \quad (12); \text{ and}$$

$$E = Ax_d + By_d + Cz_d \quad (13).$$

Given equation (12) and (13), equation (11) can be re-written as equation (14).

$$F + tE + D = 0 \quad (14)$$

In equation (14), F is the scalar product of the normal of the plane with the position vector of the origin $(x_0; y_0; z_0)^T$, and E is the scalar product of the normal of the plane with the direction vector of the line $(x_d; y_d; z_d)^T$.

If $F = 0$, the position vector of the origin $(x_0; y_0; z_0)^T$ is orthogonal to the normal of the plane. If $E = 0$, the vector of the line $(x_d; y_d; z_d)^T$ is orthogonal to the normal of the plane. Equations (9) and (10) may be used to determine whether the virtual ray rg intersects the wall as follows.

If $E = 0$ and $F + D = 0$, the transmitter 202E and the virtual ray $r_g$ are in the same plane as the wall on which point B lies. In this case, to determine if the virtual ray $r_g$ intersects the wall, the nearest point on the virtual ray $r_g$ from each corner point of the wall may be located. If at least one of the located points lies on the wall, the virtual ray $r_g$ is determined to intersect the wall.

Figure 6A:
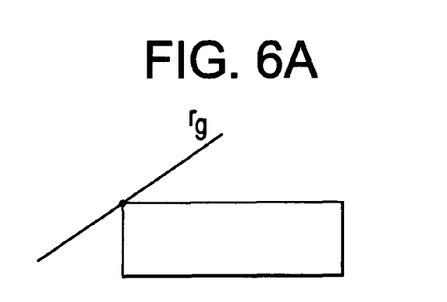
FIGS. 6A-6D show example intersections between a virtual ray and a wall, when the virtual ray and the wall lie in the same plane.
Figure 6B:
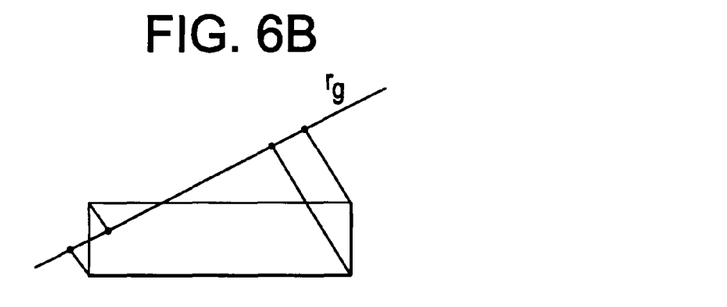
Figure 6C:
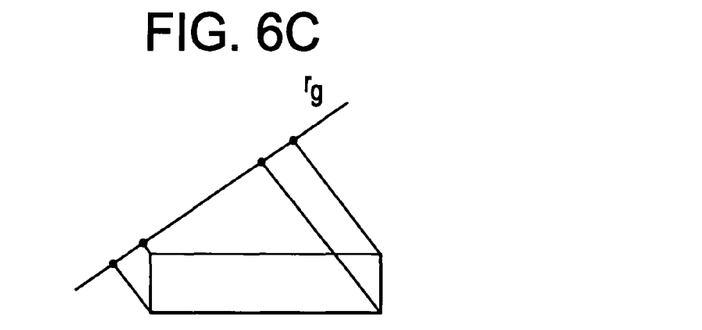
Figure 6D:
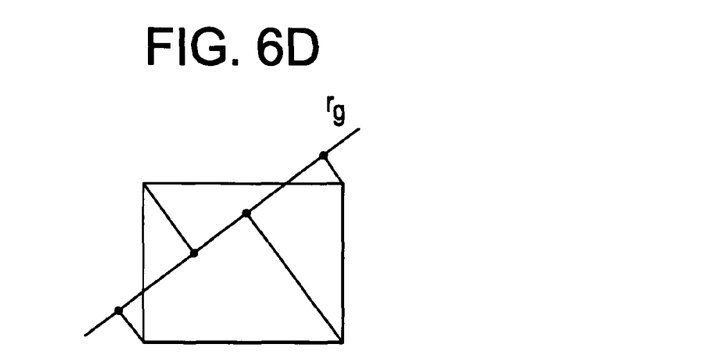

FIGS. 6A-6D show example possibilities, which need be distinguished if the virtual ray $r_g$ and the wall lie in the same plane. FIG. 6A shows an example in which the virtual ray $r_g$ and the wall lie on the same plane, and the ray intersects the wall only at a corner point. FIG. 6B shows an example in which only one point on the virtual ray $r_g$ closest to a corner of the wall lies on the wall. In this case, the virtual ray $r_g$ is determined to intersect the wall. FIG. 6C shows an example in which the virtual ray $r_g$ does not intersect the wall. In this case, none of the points on the virtual ray $r_g$ closest to a corner of the wall lies on the wall. FIG. 6D shows an example in which two of the points on the virtual ray $r_g$ closest to a corner of the wall lie on the wall. In this case, the virtual ray $r_g$ is determined to intersect the wall.

If $E=0$ and $F+D \neq 0$, the virtual ray $r_g$ is parallel to the plane of the wall, but not in the same plane as the wall, and the virtual ray $r_g$ does not intersect the wall.

If $E \neq 0$ and $F+D=0$, the origin $(x_0; y_0; z_0)^T$ is in the same plane as the wall, but the virtual ray $r_g$ is not parallel to the plane of the wall. If the coordinates of the origin $(x_0; y_0; z_0)^T$ fulfill the conditions in equation (9), the origin $(x_0; y_0; z_0)^T$ lies on the wall.

If $E \neq 0$ and $F+D \neq 0$, the line intersects the plane of the wall, but the origin $(x_0; y_0; z_0)^T$ and the virtual ray $r_g$ are not on the same plane as the wall. In this example, a non-zero t value is given by equation (15):

$$t = -\frac{(D+F)}{E} \quad (15)$$

According to at least some example embodiments, the virtual ray $r_g$ may intersect the plane of the wall if $t>0$. The point of incidence (or point B in this example) for the virtual ray $r_g$ and the wall may be determined using equation (10), and whether the intersection point lies on the wall may be determined by examining whether the conditions of equation (9) are satisfied.

Returning to FIG. 4, the virtual ray $r_g$ impinges a wall at point B. LEU 204R-6 may then determine whether a stopping condition has been met at point B.

As noted above, a stopping condition is met at point B if:
 (a) The predicted power P of the virtual ray is greater than or equal to the expected power $P_T$, where the expected power $P_T$ is the known transmit power of the transmitter;
 (b) The number of points of incidence on the path traversed by the virtual ray exceeds a threshold limit; or
 (c) The virtual ray leaves the building.

Referring back to FIG. 2, according to at least one example embodiment, receiving unit 204R-2 may calculate the receiving power $P_R$ of a received ray using equation (16).

$$P_R = G_T G_R \left(\frac{\lambda}{2\pi d}\right)^2 \prod_{m=1}^{M} t_m \prod_{k=1}^{K} r_k P_T \quad (16)$$

In equation (16), d is the unwrapped distance traveled by the ray, $G_T$ is the transmit antenna gain, $G_R$ is the received antenna gain, $P_T$ is the transmit power, $P_R$ is the received power, and $\lambda$ is the wavelength. Equation (16) assumes that the ray undergoes M transmissions and K reflections before reaching the receiver. Variable $t_m$ denotes the transmission coefficient for the m-th transmission; and $r_k$ denotes the reflection coefficient for the k-th reflection. All of M, K, m and k are integers.

Given equation (16), the LEU 204R-6 may predict the power at any point along the back-traced ray path by inverting equation (16) discussed above. Assuming the ray has undergone M transmissions and K reflections through its path from the transmitter 202E to the receiver 204R, the product of the M transmission and K reflection coefficients is S, which is represented by equation (17) below.

$$S = \prod_{m=1}^{M} t_m \prod_{k=1}^{K} r_k \quad (17)$$

Because the reflection and transmission coefficients range between 0 and 1, S decreases as the number of reflections and/or transmissions increases. Using S to represent equation (17) and inverting equation (16), the LEU 204R-6 may calculate the predicted power P at any point on a backward traced ray using equation (18).

$$P = \frac{4\pi^2 d^2}{G_T G_R \lambda^2 S} P_R \quad (18)$$

In equation (18), $G_T$ is the transmit antenna gain, $G_R$ is the received antenna gain, $\lambda$ is the wavelength, $P_R$ is the received power and d is the total path the ray traveled between the point at which the predicted power P is being determined and the receiver 204R. Each of these values may be known or calculated at the LEU 204R-6. Parameters $G_T$, $G_R$, and $\lambda$ are known system parameters, and coefficients $r_k$ and $t_k$ are known properties of walls and structures within the building. The coefficients $r_k$ and $t_k$ may be computed based on properties of materials used to construct the building. The distance d is the total travel distance computed by the location estimation unit 204R-6 during simulation. The transmit power $P_T$ is a known system property.

Because the ray is being backward traced, the predicted power of the virtual ray P increases with increasing distance from the receiver 204R, and an increasing number of reflections and/or transmissions. Accordingly, a received ray having a smaller power $P_R$ may need to be backward traced a further distance, reflected and/or transmitted a greater number of times before reaching a value greater than or equal to the expected power $P_T$.

Returning to FIG. 4, to determine if stopping condition (a) is met at point B, the LEU 204R-6 may compare the predicted power P and the expected or known transmit power $P_T$ of the transmitter 202E. If the predicted power $P_T$ is greater than or equal to the expected power $P_T$ of the transmitter 202E, then stopping condition (a) is met, and backward ray tracing of the ray may be terminated.

If the predicted power P is less than the expected power $P_T$, stopping condition (a) is not met, and the LEU 204R-6 may determine if the number of points of incidence on the path of the virtual ray $r_g$ is greater than a threshold value. When backward ray tracing a ray, the LEU 204R-6 may track the number of points of incidence (e.g., reflections and/or transmissions) along the path of the virtual ray. That is, for example, the LEU 204R-6 may increment a counter (not shown) each time the virtual ray impinges on a wall or structure of a building.

An example threshold number of points of incidence for a virtual ray may be about 5, although any threshold may be used. If the number of points of incidence including the current point of incidence (point B in this case) has been reached, stopping condition (b) has been met and backward ray tracing of the ray including the ray segment originating at point B may terminate.

Regardless of whether a stopping condition is met, at point B, the coordinates of this point may be determined, and the location may be stored in the memory 204R-8 as a possible candidate location.

Returning to FIG. 4, if none of the above stopping conditions are met, point B becomes an effective transmitter (or emitter) from which transmitted virtual ray segment $r_k$ and reflected virtual ray segment $r_h$ emanate. Because the reflected ray segment $r_h$ exits the building, stopping condition (c) has been met for virtual ray segment $r_h$, and thus, backward tracing of virtual ray segment $r_h$ is terminated.

Backward tracing of virtual ray segment $r_k$ continues, however, because the transmitted virtual ray segment $r_k$ does not exit the building, but impinges another wall at point C. At point C, the LEU 204R-6 may determine if stopping conditions (a) or (b) have been met in the same manner as described above with regard to point B. As also described above, regardless of whether stopping conditions are met at point C, the coordinates of this point may be determined, and the location may be stored in the memory 204R-8 as a possible candidate location.

If stopping conditions are met at point C, the backward ray tracing may terminate. If stopping conditions are not met at point C, point C becomes another effective transmitter (or emitter) from which the reflected virtual ray segment $r_l$ and transmitted virtual ray segment $r_m$ emanate. Because the transmitted virtual ray segment $r_m$ exits the building, stopping condition (c) has been met for virtual ray segment $r_m$, and thus, backward tracing of this virtual ray segment is terminated.

Reflected virtual ray segment $r_l$ does not exit the building, but instead impinges at point E. At point E, LEU 204R-6 may determine if stopping conditions (a) or (b) have been met in the same manner as described above with regard to points B and C. As also described above, regardless of whether stopping conditions are met at point E, the coordinates of this point may be determined, and the location may be stored in the memory 204R-8 as a possible candidate location.

Because point E is the location of the transmitter 202E, the predicted power P of the virtual ray at point E may be greater than or equal to the expected power $P_T$, and thus, stopping condition (a) is met for the virtual ray. After a stopping condition is met for each backward traced ray, the LEU 204R-6 may determine the actual location of the transmitter as discussed above.

According to example embodiments, a single receiver may be used to localize a transmitter. However, multiple receivers may also or alternatively be used to decrease prediction error associated with the localization of the transmitter.

If the location of the transmitter does not change over the duration of sensing and subsequent processing (e.g., the transmitter is stationary), the location of the antenna setup at the receiver may be changed and multiple measurements may be taken instead of using multiple receivers.

Figure 5:
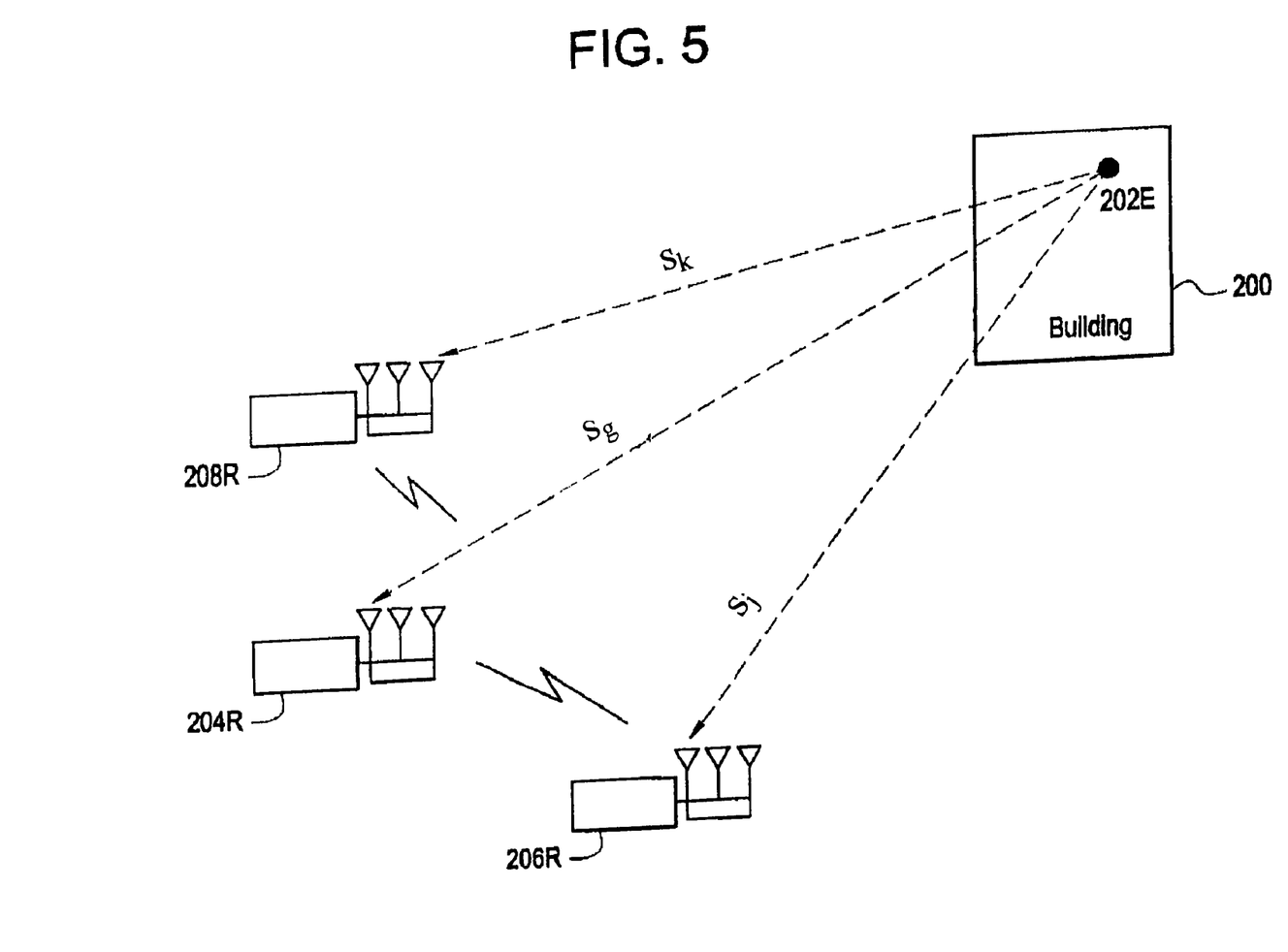
FIG. 5 illustrates a transmitter localization system according to another example embodiment.

FIG. 5 illustrates a transmitter localization system, according to another example embodiment. As shown, the system may include multiple receivers 204R, 206R and 208R, each of which may receive signals $s_g$, $s_j$, and $s_k$ transmitted from the transmitter 202E. According to this example embodiment, each receiver 204R, 206R and 208R sends to a central processing unit (e.g., LEU 204R-6 at receiver 204R) characteristics of the received signals $s_g$, $s_j$, and $s_k$. At least receiver 206R and 208R may be transceivers capable of receiving signals $s_j$, and $s_k$ transmitted from the transmitter 202E and transmitting information in the form of wireless signals to the receiver 204R. For example, the signal characteristics may include the AOA, the TOA, and the received power of each incoming ray and the coordinates of the receiver itself.

In this example embodiment, each receiver may operate in a manner similar to the receiver 204R of FIG. 2, except for the ray selection procedure. In this example embodiment, the N strongest rays received among all antennas may be selected for tracing back.

For example, assuming there are total of K receivers and the k-th receiver reports $n_k$ rays. Out of the $\Sigma_{k=1}^{K} n_k$ rays, the N rays with the highest received power may be selected. Thus, a receiver which is closer to the transmitter may be more likely to contribute with more rays, whereas receivers farther away may contribute fewer rays. Selecting the rays having the highest associated power among all rays received at that receiver may decrease computational time because the number of the walls, which the ray impinges using backward ray tracing may be less than those for a weaker ray.

According to example embodiments, increasing the number of receivers may decrease the prediction error, but may not increase the computation time because a fixed number of rays is chosen independent of the number of receivers. In at least some example embodiments, increasing the number of receivers may decrease computational time because stronger rays may be generated. Backward ray tracing rays from different receivers results in fewer intersections; thus, there are fewer candidate locations, which may further decrease computation time.

Example embodiments provide a backward ray tracing-based localization tool for indoor environments. Backward ray tracing may be effective even with degradations, especially if multiple receivers are used. If the angular resolution is relatively high, example embodiments provide more reliable results with a single receiver than the conventional localization methods. At lower angular resolution, multiple receivers may be needed to localize with sufficient accuracy. According to example embodiments, LOS is not required between the emitter and receiver.

The invention being thus described, it will be obvious that the same may be varied in many ways. Such variations are not to be regarded as a departure from the invention, and all such modifications are intended to be included within the scope of the invention.

We claim:

1. A method for locating a transmitter, the method comprising:

generating, at a receiver, a plurality of candidate locations for the transmitter based on signal ray characteristics of a plurality of signal rays, the candidate locations being points along an estimated path traversed by the plurality of signal rays from the transmitter to the receiver;
calculating, for each candidate location, at least one weighted metric by summing a plurality of location metrics associated with each respective candidate location;
locating the transmitter based on the at least one weighted metric associated with each candidate location;
launching a simulated virtual ray toward a first point of incidence on the reverse path of a received signal ray, the first point being a last point traversed by a received signal ray, a point of incidence being a point at which a signal ray impinges with a structure or wall of a building; and
simulating a reverse path of the received signal ray until a stopping condition is met; and
calculating a predicted power for the simulated virtual ray at the first point of incidence, wherein the stopping condition is met if the predicted power is greater than or equal to a transmission power of the received signal ray, wherein a location metric for a first candidate location among the plurality of candidate locations is calculated, at least in part, based on a comparison between a prediction metric for a signal ray at the first candidate location and a prediction metric for the signal ray at a second of the plurality of candidate locations.

2. The method of claim 1, wherein the generating step further comprises:
tracing back, from the receiver, each of the plurality of signal rays received from the transmitter until a stopping condition is met;
identifying points of incidence traversed during the tracing back step; and
selecting at least one point of intersection as a candidate location based on locations of the points of incidence.

3. The method of claim 2, wherein the selecting step further comprises:
comparing the locations of each point of incidence to identify the points of intersection common to at least two back-traced signal rays; and
selecting the points of incidence common to at least two back-traced rays as candidate locations.

4. The method of claim 2, wherein:
during the simulating step, each point of incidence on the reverse path is recorded in a memory at the receiver.

5. The method of claim 4, wherein the simulating step further comprises:
determining whether a stopping condition has been met at the first point of incidence based additionally on known system parameters and predicted characteristics of the simulated virtual ray; and
deciding whether to terminate simulation of the reverse path of the received signal ray based on the determining step.

6. The method of claim 5, wherein the determining step further comprises:
determining whether the simulated virtual ray exits a structure in which the transmitter is located at the first point of incidence; and wherein
the stopping condition also being met if the first simulated virtual ray segment is determined to have left the structure.

7. The method of claim 5, wherein the determining step further comprises:
counting a number of points of incidence traversed by the simulated virtual ray prior to and including the first point of incidence;
comparing the number of points of incidence with a threshold value; and wherein
the stopping condition also being met if the number of points of incidence is greater than or equal to the threshold value.

8. The method of claim 1, wherein the generating step further comprises:
estimating signal ray characteristics associated with a signal ray at each candidate location traversed by the signal ray based on known system parameters and predicted signal ray characteristics of the signal ray at each traversed candidate location; and
generating the at least one weighted metric based on the estimated signal ray characteristics.

9. The method of claim 1, wherein the signal ray characteristics include at least one of transmission power and receiving power.

10. The method of claim 1, wherein the virtual signal ray characteristics include at least one of power, distance, arrival time and locations of intersecting virtual rays.

11. A transceiver for locating a transmitter, the transceiver comprising:
a location estimation unit configured to,
generate a plurality of candidate locations for the transmitter based on signal ray characteristics of a plurality of signal rays, the candidate locations being points along an estimated path traversed by the plurality of signal rays from the transmitter to the receiver,
calculate, for each candidate location at least one weighted metric summing a plurality of location metrics associated with each respective candidate location, and
locate the transmitter based on the at least one weighted metric associated with each candidate location; wherein
a location metric for a first candidate location among the plurality of candidate locations is calculated, at least in part, based on a comparison between a prediction metric for a signal ray at the first candidate location and a prediction metric for the signal ray at a second of the plurality of candidate locations.

12. The transceiver of claim 11, further comprising:
a memory coupled to the location estimation unit; wherein
the location estimation unit is further configured to trace back a received signal ray by launching a simulated virtual ray toward a first point of incidence on the reverse path of a received signal ray, the first point being a last point traversed by a received signal ray, and simulate a reverse path of the received signal ray until a stopping condition is met; and wherein
during the simulating, each point of incidence on the reverse path is recorded in the memory.

13. The transceiver of claim 12, further comprising:
a receiving unit configured to calculate signal ray characteristics of signal rays received from the transmitter; wherein
the location estimation unit is further configured to determine whether a stopping condition has been met at the first point of incidence based on known system parameters and predicted characteristics of the simulated virtual ray, the predicted characteristics being determined based at least partially on the signal ray characteristics calculated by the receiving unit, and the location estimation unit being further configured to decide whether to terminate simulation of the reverse path of the received signal ray based on whether a stopping condition is met.

14. The transceiver of claim 13, wherein the location estimation unit terminates simulation of at least one virtual ray segment of the simulated virtual ray if a stopping condition is met.

15. The method of claim 1, wherein the prediction metric for a candidate location is a ratio of a first power level metric for the signal ray at the first candidate location and a second power level metric for the signal ray at the second candidate location, the power level metrics including at least one of a power difference metric and an expected-predicted power metric.

16. The method of claim 15, wherein, the first power level metric is one of a predicted power and a power deviation for the signal ray at the first candidate location and the second candidate location is a candidate location among the plurality of candidate locations with which a signal ray having at least one of a maximum predicted power and a maximum power deviation is associated.

\* \* \* \* \*